US010853069B2

(12) United States Patent
Han et al.

(10) Patent No.: US 10,853,069 B2
(45) Date of Patent: Dec. 1, 2020

(54) APPARATUS AND METHODS FOR COMPARING VECTORS

(71) Applicant: Cambricon Technologies Corporation Limited, Beijing (CN)

(72) Inventors: Dong Han, Beijing (CN); Xiao Zhang, Beijing (CN); Shaoli Liu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/247,260

(22) Filed: Jan. 14, 2019

(65) Prior Publication Data

US 2019/0163477 A1 May 30, 2019

Related U.S. Application Data (63) Continuation of application No. 16/171,289, filed on Oct. 25, 2018, now abandoned, which is a
(Continued)

(51) Int. Cl.
*G06F 9/30* (2018.01)
*G06F 7/02* (2006.01)
(Continued)

(52) U.S. Cl.
CPC ............ *G06F 9/30036* (2013.01); *G06F 7/02* (2013.01); *G06F 9/3016* (2013.01);
(Continued)

(58) Field of Classification Search
CPC .................... G06F 9/30021; G06F 9/30036
(Continued)

(56) References Cited

U.S. PATENT DOCUMENTS 5,077,659 A * 12/1991 Nagata .................... G06F 9/223
712/210
5,838,984 A * 11/1998 Nguyen .............. G06F 9/30025
712/5
(Continued)

FOREIGN PATENT DOCUMENTS

CN 1584824 A 2/2005
CN 104699458 A 6/2015
(Continued)

OTHER PUBLICATIONS

You et al., "Scaling Support Vector Machines on modern HPC platforms," J. Parallel Distrib. Comput. 76 (2015) 16-31. Available online Sep. 21, 2014. (Year: 2014).*
(Continued)

*Primary Examiner* — Michael J Metzger
(74) *Attorney, Agent, or Firm* — Getech Law LLC; Jun Ye (57) ABSTRACT

Aspects for vector comparison in neural network are described herein. The aspects may include a direct memory access unit configured to receive a first vector and a second vector from a storage device. The first vector may include one or more first elements and the second vector may include one or more second elements. The aspects may further include a computation module that includes one or more comparers respectively configured to generate a comparison result by comparing one of the one or more first elements to a corresponding one of the one or more second elements in accordance with an instruction.

18 Claims, 4 Drawing Sheets

Related U.S. Application Data continuation-in-part of application No. PCT/CN2016/081115, filed on May 5, 2016.

(51) Int. Cl.
  *G06F 15/78* (2006.01)
  *G06N 3/04* (2006.01)
(52) U.S. Cl.
  CPC ...... *G06F 9/30021* (2013.01); *G06F 15/7839* (2013.01); *G06N 3/04* (2013.01)
(58) Field of Classification Search
  USPC .......................................................... 712/7
  See application file for complete search history.

(56) References Cited

U.S. PATENT DOCUMENTS

| | | | | | |
|---|---|---|---|---|---|
| 5,872,964 | A * | 2/1999 | Ishiguro | .............. | G06F 9/30021 712/234 |
| 7,565,514 | B2 * | 7/2009 | Moyer | ................ | G06F 9/30036 712/22 |
| 7,793,084 | B1 * | 9/2010 | Mimar | ................ | G06F 9/30021 712/236 |
| 8,332,620 | B2 * | 12/2012 | Dayan | ................ | G06F 9/30018 712/224 |
| 9,489,199 | B2 * | 11/2016 | Gopal | ................ | G06F 9/30036 |
| 2003/0070059 | A1 * | 4/2003 | Dally | ................... | G06F 9/3001 712/7 |
| 2006/0059310 | A1 * | 3/2006 | Asher | ................ | G06F 9/30014 711/126 |
| 2008/0046683 | A1 * | 2/2008 | Codrescu | ............ | G06F 9/30021 712/7 |
| 2013/0138925 | A1 * | 5/2013 | Hickey | ................... | G06F 9/383 712/214 |
| 2013/0246759 | A1 * | 9/2013 | Bradbury | ............ | G06F 9/45516 712/222 |
| 2014/0019713 | A1 * | 1/2014 | Ould-Ahmed-Vall | ...................... | G06F 15/78 712/4 |
| 2014/0207836 | A1 * | 7/2014 | Mundarath | ............. | G06F 7/026 708/201 |
| 2014/0289497 | A1 * | 9/2014 | Gonion | ............... | G06F 9/30036 712/9 |
| 2015/0186141 | A1 * | 7/2015 | Plotnikov | ........... | G06F 9/30018 712/210 |
| 2016/0124715 | A1 * | 5/2016 | Burgess | .................... | G06F 7/50 708/520 |
| 2016/0179521 | A1 * | 6/2016 | Jha | ...................... | G06F 9/30018 712/5 |
| 2016/0179550 | A1 * | 6/2016 | Wang | .................... | G06F 9/3834 712/23 |
| 2016/0188336 | A1 * | 6/2016 | Valentine | ............ | G06F 9/30021 712/5 |
| 2016/0224514 | A1 * | 8/2016 | Moudgill | ............ | G06F 15/8076 |
| 2016/0378477 | A1 * | 12/2016 | Gschwind | ........... | G06F 9/30036 712/220 |
| 2019/0050226 | A1 * | 2/2019 | Grocutt | ................. | G06F 9/3016 |

FOREIGN PATENT DOCUMENTS

| | | |
|---|---|---|
| CN | 104699458 A | 6/2015 |
| CN | 105229599 A | 1/2016 |
| CN | 105229599 A | 1/2016 |
| WO | 2017/185395 A1 | 11/2017 |

OTHER PUBLICATIONS

T. Chen, et al., "A Small-Footprint Accelerator for Large-Scale Neural Networks", ACM Transactions on Computer Systems, vol. 33, No. 2, Article 6, May 2015, 27 pages.

Z. Du, et al., "An Accelerator for High Efficient Vision Processing", IEEE Transactions on Computer-aided Design of Integrated Circuits and System, vol. 36, No. 2, Feb. 2017, pp. 227-240.

S. Liu, et al., "Cambricon: An Instruction Set Architecture for Neural Networks", 2016 ACM/IEEE 43rd Annual International Symposium on Computer Architecture, Oct. 12, 2016, pp. 393-405.

S. Zhang, et al., "Cambricon-X" An Accelerator for Sparse Neural Networks, The 49th Annual IEEE/ACM International Symposium on Microarchitecture Article No. 20, Oct. 15, 2016, 12 pages.

Y. Chen, et al., "DaDianNao: A Machine-Learning Supercomputer", 2014 47th Annual IEEE/ACM International Symposium on Microarchitecture, Dec. 13, 2014, pp. 609-622.

T. Luo, et al., "DaDianNao: A Neural Network Supercomputer", IEEE Transaction on Computers, vol. 66, No. 1, Jan. 2017, pp. 73-88.

T. Chen, et al., "DianNao: A Small-Footprint High-Throughput Accelerator for Ubiquitous Machine-Learning", ASPLOS 14, Proceedings of the 19th international conference on Architectural support for programming languages and operating systems, Feb. 24, 2014, pp. 269-283.

Y. Chen, et al., "DianNao Family: Energy-Efficient Hardware Accelerators for Machine Learning", Communications of the ACM, vol. 59, No. 11, Nov. 2016, pp. 105-112.

D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.

Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

201610266782.2—Office Action, dated Apr. 22, 2019, 8 pages. (no English translation).

PCT/CN2016/081115—International Search Report, dated Feb. 8, 2019, 9 pages. (no English translation).

EP16899906.8, Official Action dated Feb. 14, 2020, 4 Pages.

CN201610266782.2—Office Action, dated Jan. 6, 2020, 8 pages. (no English translation).

* cited by examiner

APPARATUS AND METHODS FOR COMPARING VECTORS

CROSS-REFERENCE TO RELATED APPLICATIONS

The present application is a continuation of U.S. application Ser. No. 16/171,289, filed on Oct. 25, 2018, which is a continuation-in-part of PCT Application No. PCT/CN2016/081115, filed on May 5, 2016, which claims priority to commonly owned CN Application No. 201610266782.2, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, comparison between two vectors may be performed frequently in deep learning processes in MMNs.

A known method to compare vectors of a multilayer artificial neural network is to use a general-purpose processor. However, one of the defects of the method is low operational performance of a single general-purpose processor which cannot meet performance requirements for usual multilayer neural network operations. When multiple general-purpose processors execute concurrently, the intercommunication among them also becomes a performance bottleneck.

Another known method to compare vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for vector comparison in a neural network. The example apparatus may include a direct memory access unit configured to receive a first vector and a second vector from a storage device. The first vector may include one or more first elements and the second vector may include one or more second elements. The apparatus may further include a computation module that includes one or more comparers respectively configured to generate a comparison result by comparing one of the one or more first elements to a corresponding one of the one or more second elements in accordance with an instruction.

Another example aspect may include an example method for vector comparison in a neural network. The example method may include receiving, by a direct memory access unit, a first vector and a second vector from a storage device, wherein the first vector includes one or more first elements and the second vector includes one or more second elements; and respectively generating, by one or more comparers of a computation module, a comparison result by comparing one of the one or more first elements to a corresponding one of the one or more second elements in accordance with an instruction.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A comparison between two vectors of a same length may be performed in a neural network. A vector may refer to one or more values formatted in a one-dimensional data structure. The values included in a vector may be referred to as elements. A first vector may be represented as (A(1), A(2) . . . A(k−1), A(k) . . . A(n)). The first vector may be denoted as "first vector A" hereafter. A second vector may be represented as (B(1), B(2) . . . B(k−1), B(k) . . . B(n)). The second vector may be denoted as "second vector B" hereafter. As shown, the first vector A and the second vector B each may include same number of elements, e.g., n.

Figure 1:
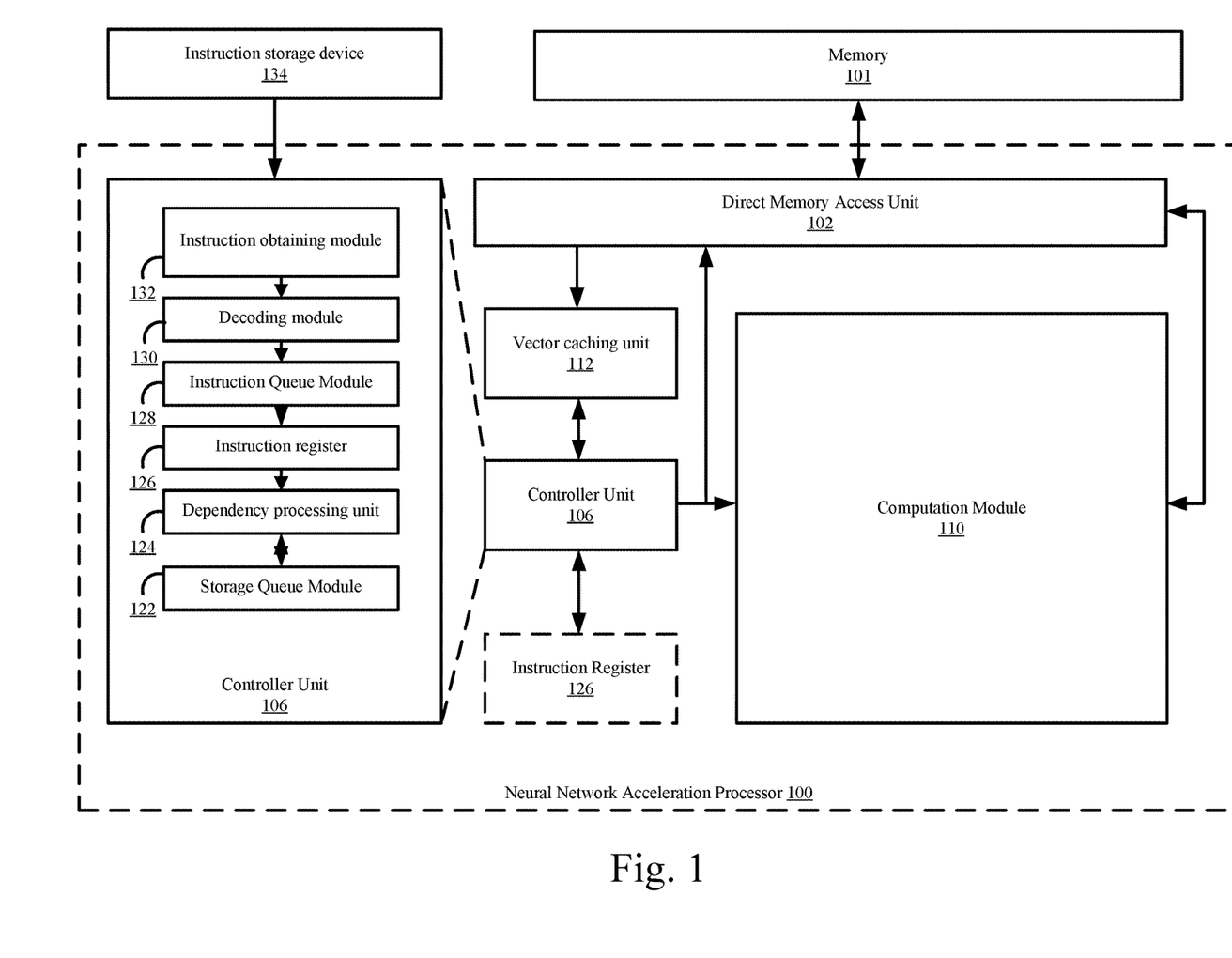
FIG. 1 illustrates a block diagram of an example neural network acceleration processor by which vector comparison may be implemented in a neural network.

FIG. 1 illustrates a block diagram of an example neural network acceleration processor 100 by which vector comparison may be implemented in a neural network.

As depicted, the example neural network acceleration processor 100 may include a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector comparison instruction may originate from an instruction storage device 134 to the controller unit 106. An instruction obtaining module 132 may be configured to obtain a vector comparison instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addressed in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a vector comparison instruction, for example, may include an address of the first vector A, the address of the second vector B, the length (or a bit length) of the first vector A and the second vector B, and the address of an output comparison vector in the memory 101, etc. As depicted, in some examples, the instruction register 126 may be implemented by one or more registers external to the controller unit.

The instruction register 126 may be further configured to store scalar values for the instruction. Once the relevant values are retrieved, the instruction may be sent to a dependency processing unit 124.

The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode the instruction into micro-instructions for controlling operations of other modules including the direct memory access unit 102 and the computation module 110.

The direct memory access unit 102 may be configured to access an external address range (e.g., in an external storage device such as a memory 101) and directly read or write vector data into respective caching units in the computation module 110 in accordance with the received instruction.

The vector comparison instruction may be one of the following instructions: a greater-than-equal-to (GE) instruction, a less-than-equal-to (LE) instruction, a greater-than (GT) instruction, a less-than (LT) instruction, an equal-to (EQ) instruction, or an unequal-to (UEQ) instruction.

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Upon receiving the vector comparison instruction from the controller unit 106 and the vectors from the vector caching unit 112, the computation module 110 may be configured to respectively compare each element in the first vector A to each element in the second vector B. As stated above, the first vector A and the second vector B may be respectively represented as (A(1), A(2) . . . A(k−1), A(k) . . . A(n)) and (B(1), B(2) . . . B(k−1), B(k) . . . B(n)). The computation module 110 may be configured to respectively compare the corresponding elements in the first vector A and the second vector B, e.g., A(1) and B(1), A(2) and B(2), . . . , A(n) and B(n). For each pair of the elements, the computation module 110 may generate a comparison result based on the vector comparison instruction.

If the instruction is a greater-than-equal-to (GE) instruction, the comparison result may be generated as a true value based on a determination that the element in the first vector A (e.g., A(1)) is greater than or equal to the corresponding element in the second vector B (e.g., B(1)).

If the instruction is a less-than-equal-to (LE) instruction, the comparison result may be generated as a true value based on a determination that the element in the first vector A (e.g., A(1)) is less than or equal to the corresponding element in the second vector B (e.g., B(1)).

If the instruction is a greater-than (GT) instruction, the comparison result may be generated as a true value based on a determination that the element in the first vector A (e.g., A(1)) is greater than the corresponding element in the second vector B (e.g., B(1)).

If the instruction is a less-than (LT) instruction, the comparison result may be generated as a true value based on a determination that the element in the first vector A (e.g., A(1)) is less than the corresponding element in the second vector B (e.g., B(1)).

If the instruction is an equal-to (EQ) instruction, the comparison result may be generated as a true value based on a determination that the element in the first vector A (e.g., A(1)) is equal to the corresponding element in the second vector B (e.g., B(1)).

If the instruction is an unequal-to (UEQ) instruction, the comparison result may be generated as a true value based on a determination that the element in the first vector A (e.g., A(1)) is unequal to the corresponding element in the second vector B (e.g., B(1)).

Figure 2:
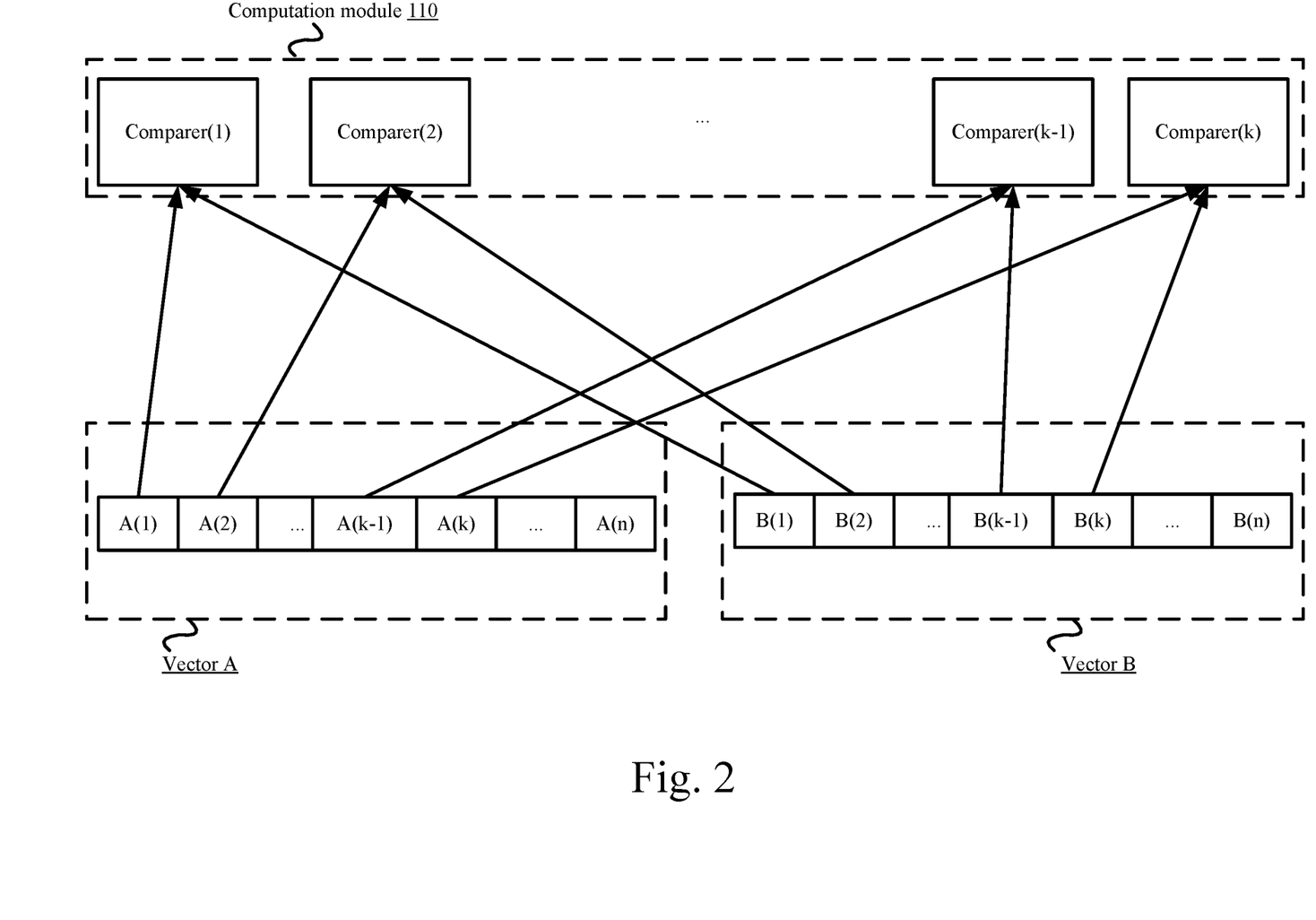
FIG. 2 illustrates an example vector comparison between two vectors that may be performed by the example neural network acceleration processor.

FIG. 2 illustrates an example vector comparison between two vectors that may be performed by the example neural network acceleration processor.

As depicted, the computation module 110 may include one or more comparers, e.g., comparer (1) comparer (k). The number of the comparers may be different from the number of the elements in the first vector A and the second vector B. In an example where the number of comparers is less than the number of elements in the vectors (e.g., k<n), the comparers may be configured to the first k elements in the first vector A and the second vector B. That is, the comparers, e.g., comparer (1) . . . comparer (k), may be configured to respectively compare the corresponding elements in the first vector A and the second vector B. For example, the comparer (1) may be configured to compare the element A(1) to the element B(1) and the comparer (k) may be configured to compare the element A(k) to the element B(k). The comparison results for the first k elements may be temporarily stored and the comparers may then be configured to compare the next k elements till all the elements in the first vector A and the second vector B are compared.

Figure 3:
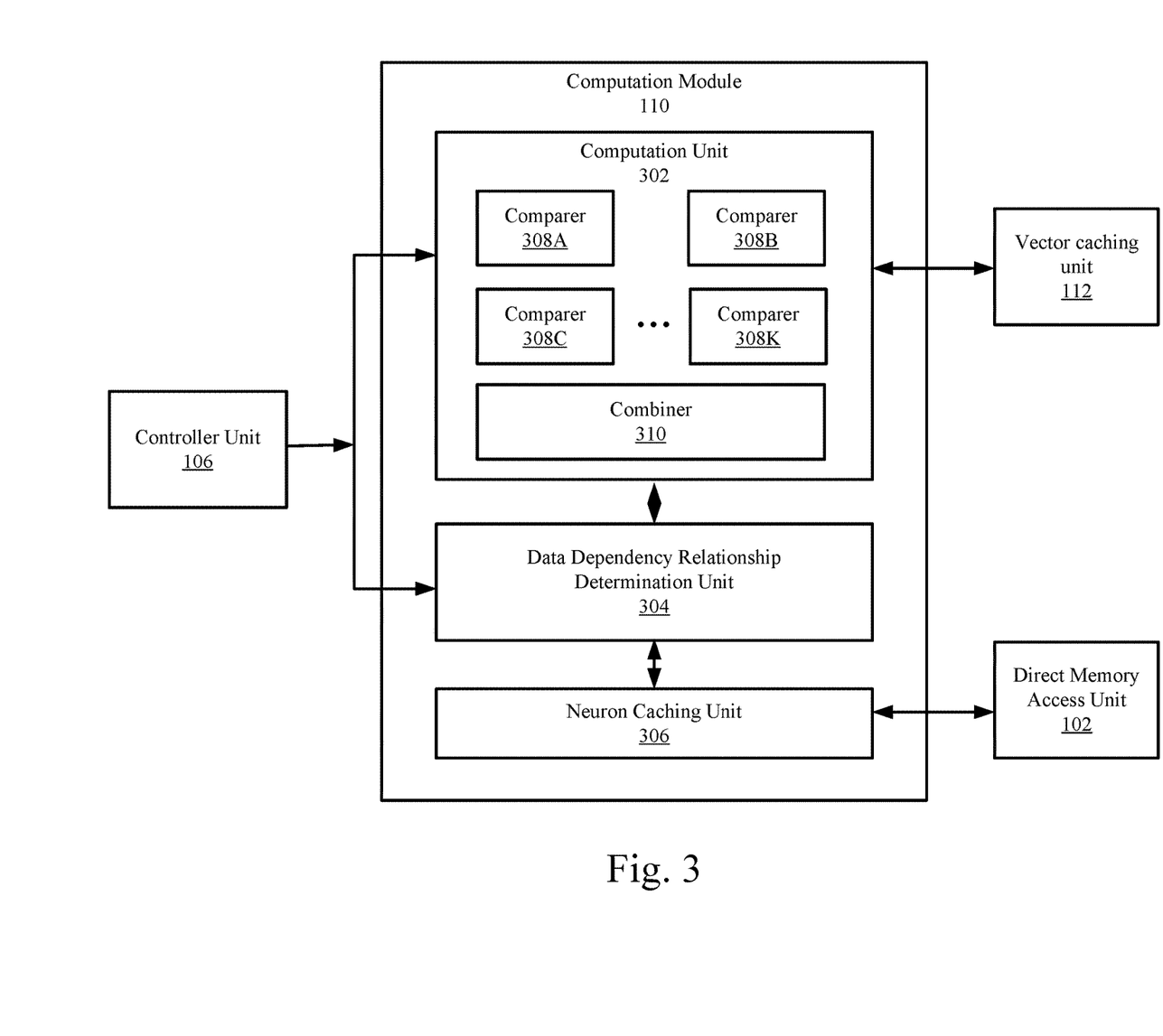
FIG. 3 illustrates an example computation module in the example neural network acceleration processor by which vector comparison may be implemented in a neural network.

FIG. 3 illustrates an example computation module in the example neural network acceleration processor by which vector comparison may be implemented in a neural network.

As depicted, the computation module 110 may include a computation unit 302, a data dependency relationship determination unit 304, a neuron caching unit 306. The computation unit 302 may further include one or more comparers 308A, 308B, 308C . . . 308K (collectively referred to as "comparers 308") and a combiner 310.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the first vector A and the second vector B.

The computation unit 302 may be configured to receive the micro-instructions decoded from the vector comparison instructions from the controller unit 106. In the example that the micro-instructions instruct the computation module 110 to perform a vector comparison between the first vector A and the second vector B, the comparers 308 may be configured to respectively compare the corresponding elements in the first vector A and the second vector B, e.g., A(1) and B(1), A(2) and B(2), . . . , A(n) and B(n). Each of the comparers 308 may generate a comparison result based on the corresponding elements in accordance with the vector comparison instruction.

If the instruction is a greater-than-equal-to (GE) instruction, the comparison result may be generated as a true value based on a determination that the element in the first vector A (e.g., A(1)) is greater than or equal to the corresponding element in the second vector B (e.g., B(1)).

If the instruction is a less-than-equal-to (LE) instruction, the comparison result may be generated as a true value based on a determination that the element in the first vector A (e.g., A(1)) is less than or equal to the corresponding element in the second vector B (e.g., B(1)).

If the instruction is a greater-than (GT) instruction, the comparison result may be generated as a true value based on a determination that the element in the first vector A (e.g., A(1)) is greater than the corresponding element in the second vector B (e.g., B(1)).

If the instruction is a less-than (LT) instruction, the comparison result may be generated as a true value based on a determination that the element in the first vector A (e.g., A(1)) is less than the corresponding element in the second vector B (e.g., B(1)).

If the instruction is an equal-to (EQ) instruction, the comparison result may be generated as a true value based on a determination that the element in the first vector A (e.g., A(1)) is equal to the corresponding element in the second vector B (e.g., B(1)).

If the instruction is an unequal-to (UEQ) instruction, the comparison result may be generated as a true value based on a determination that the element in the first vector A (e.g., A(1)) is unequal to the corresponding element in the second vector B (e.g., B(1)).

The combiner 310 of the computation unit 302 may be configured to combine the one or more comparison results respectively generated by the comparers 308 into an output comparison vector. Each element of the output comparison vector may be one of the comparison results.

Figure 4:
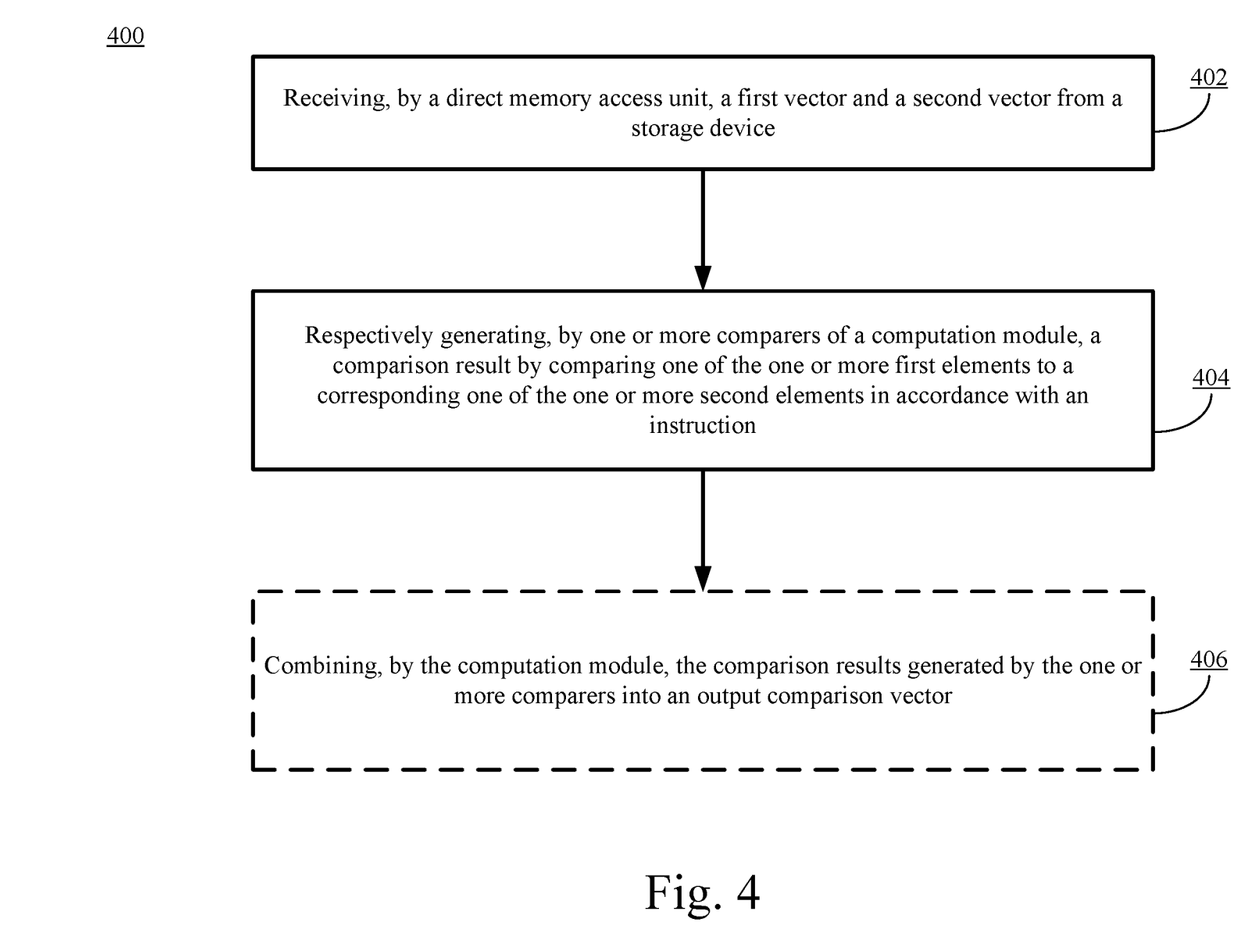
FIG. 4 illustrates flow chart of an example method for vector comparison in a neural network.

FIG. 4 illustrates flow chart of an example method 400 for vector comparison in a neural network. The method 400 may be performed by one or more components of the apparatus of FIGS. 1 and 3. Dash-lined blocks may indicate optional operations.

At block 402, the example method 400 may include receiving, by a direct memory access unit, a first vector and a second vector from a storage device. For example, the direct memory access unit 102 may be configured to receive the first vector A and the second vector B from the memory 101.

At block 404, the example method 400 may include respectively generating, by one or more comparers of a computation module, a comparison result by comparing one of the one or more first elements to a corresponding one of the one or more second elements in accordance with an instruction. For example, the comparers 308 may be configured to respectively compare the corresponding elements in the first vector A and the second vector B, e.g., A(1) and B(1), A(2) and B(2), . . . , A(n) and B(n). Each of the comparers 308 may generate a comparison result based on the corresponding elements in accordance with the vector comparison instruction.

At block 406, the example method 400 may optionally include combining, by the computation module, the comparison results generated by the one or more comparers into an output comparison vector. For example, the combiner 310 of the computation unit 302 may be configured to combine the one or more comparison results respectively generated by the comparers 308 into an output comparison vector. Each element of the output comparison vector may be one of the comparison results.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector comparison in a neural network, comprising:
   a controller unit configured to receive a vector comparison instruction for comparing a first vector to a second vector,
      wherein the first vector and the second vector respectively include a same quantity of elements, and
      wherein the vector comparison instruction includes a count of the elements; and
   a computation module configured to receive the first vector and the second vector of the bit length in accordance with the vector comparison instruction,
   wherein the computation module includes one or more comparers respectively configured to generate a comparison result by comparing one of one or more first elements included in the first vector to a corresponding one of one or more second elements included in the second vector in accordance with the vector comparison instruction.

2. The apparatus of claim 1, wherein the vector comparison instruction includes a first address of the first vector, a second address of the second vector, and an output address for an output comparison vector.

3. The apparatus of claim 1, wherein the comparison result is generated as a true value based on a determination that the one of the one or more first elements is not less than the corresponding one of the one or more second elements if the vector comparison instruction is a greater-than-equal-to (GE) instruction.

4. The apparatus of claim 1, wherein the comparison result is generated as a true value based on a determination that the one of the one or more first elements is not greater than the corresponding one of the one or more second elements if the vector comparison instruction is a less-than-equal-to (LE) instruction.

5. The apparatus of claim 1, wherein the comparison result is generated as a true value based on a determination that the one of the one or more first elements is greater than the corresponding one of the one or more second elements if the vector comparison instruction is a greater-than (GT) instruction.

6. The apparatus of claim 1, wherein the comparison result is generated as a true value based on a determination that the one of the one or more first elements is less than the corresponding one of the one or more second elements if the vector comparison instruction is a less-than (LT) instruction.

7. The apparatus of claim 1, wherein the comparison result is generated as a true value based on a determination that the one of the one or more first elements is equal to the corresponding one of the one or more second elements if the vector comparison instruction is an equal-to (EQ) instruction.

8. The apparatus of claim 1, wherein the comparison result is generated as a true value based on a determination that the one of the one or more first elements is not equal to the corresponding one of the one or more second elements if the vector comparison instruction is an unequal-to (UEQ) instruction.

9. The apparatus of claim 1,
   wherein the computation module is further configured to combine the comparison results generated by the one or more comparers into an output comparison vector, wherein the controller unit comprises an instruction obtaining module configured to obtain the vector comparison instruction from an instruction storage device, wherein the controller unit further comprises a decoding module configured to decode the vector comparison instruction into one or more micro-instructions, wherein the controller unit further comprises an instruction queue module configured to temporarily store the vector comparison instruction and one or more previously received instructions, and retrieve information corresponding to operation fields in the vector comparison instruction, wherein the controller unit further comprises an instruction register configured to store the information corresponding to the operation fields in the vector comparison instruction, wherein the controller unit further comprises a dependency processing unit configured to determine whether the vector comparison instruction has a dependency relationship with the one or more previously received instructions, and wherein the controller unit further comprises a storage queue module configured to store the vector comparison instruction while the dependency processing unit is determining whether the vector comparison instruction has the dependency relationship with the one or more previously received instructions.

10. A method for vector comparison in a neural network, comprising:

receiving, by a controller unit, a vector comparison instruction for comparing a first vector to a second vector, wherein the first vector and the second vector respectively include a same quantity of elements, wherein the vector comparison instruction includes a count of the elements;

receiving, by a computation module, the first vector and the second vector; and respectively generating, by one or more comparers of the computation module, a comparison result by comparing one of one or more first elements included in the first vector to a corresponding one of one or more second elements included in the second vector in accordance with the vector comparison instruction.

11. The method of claim 10, wherein the vector comparison instruction includes a first address of the first vector, a second address of the second vector, and an output address for an output comparison vector.

12. The method of claim 10, wherein the comparison result is generated as a true value based on a determination that the one of the one or more first elements is not less than the corresponding one of the one or more second elements if the instruction is a greater-than-equal-to (GE) instruction.

13. The method of claim 10, wherein the comparison result is generated as a true value based on a determination that the one of the one or more first elements is not greater than the corresponding one of the one or more second elements if the instruction is a less-than-equal-to (LE) instruction.

14. The method of claim 10, wherein the comparison result is generated as a true value based on a determination that the one of the one or more first elements is greater than the corresponding one of the one or more second elements if the instruction is a greater-than (GT) instruction.

15. The method of claim 10, wherein the comparison result is generated as a true value based on a determination that the one of the one or more first elements is less than the corresponding one of the one or more second elements if the instruction is a less-than (LT) instruction.

16. The method of claim 10, wherein the comparison result is generated as a true value based on a determination that the one of the one or more first elements is equal to the corresponding one of the one or more second elements if the instruction is an equal-to (EQ) instruction.

17. The method of claim 10, wherein the comparison result is generated as a true value based on a determination that the one of the one or more first elements is not equal to the corresponding one of the one or more second elements if the instruction is an unequal-to (UEQ) instruction.

18. The method of claim 10, further comprising combining, by the computation module, the comparison results generated by the one or more comparers into an output comparison vector, obtaining, by an instruction obtaining module of the controller unit, the vector comparison instruction from an instruction storage device, decoding, by a decoding module of the controller unit, the vector comparison instruction into one or more micro-instructions, temporarily storing, by an instruction queue module of the controller unit, the vector comparison instruction and one or more previously received instructions, and retrieve information corresponding to operation fields in the vector comparison instruction, storing, by an instruction register of the controller unit, the information corresponding to the operation fields in the vector comparison instruction, determining, by a dependency processing unit of the controller unit, whether the vector comparison has a dependency relationship with the one or more previously received instructions, storing, by a storage queue module of the controller unit, the vector comparison while the dependency processing unit is determining whether the vector comparison instruction has the dependency relationship with the one or more previously received instructions.

* * * * *